Aug. 3, 1965 K. D. MEARS 3,197,808
POWER OPERATED LOIN KNIFE
Filed May 27, 1963 2 Sheets-Sheet 1

INVENTOR.
K. D. MEARS
BY Herbert E. Kidder
AGENT

Aug. 3, 1965     K. D. MEARS     3,197,808
POWER OPERATED LOIN KNIFE
Filed May 27, 1963     2 Sheets-Sheet 2
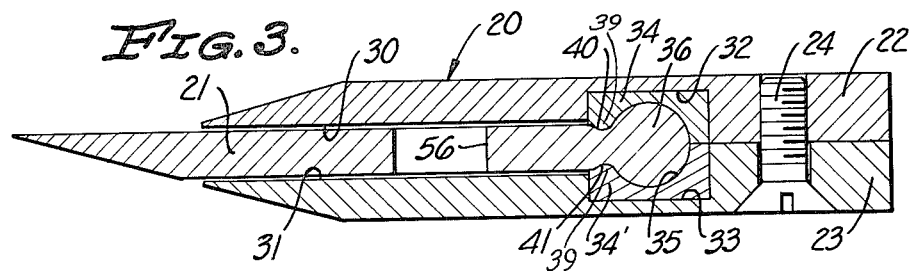
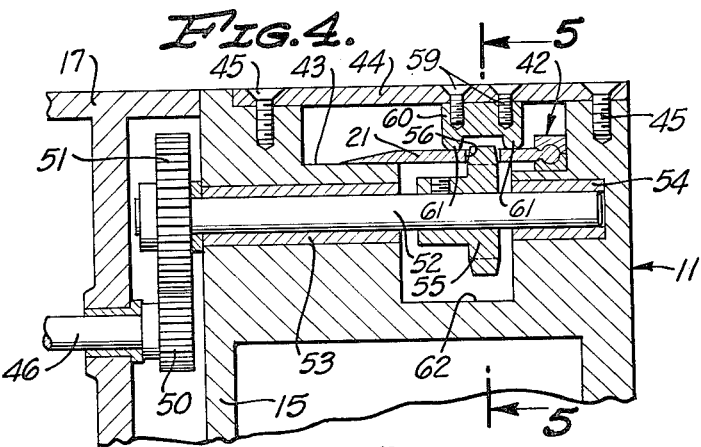
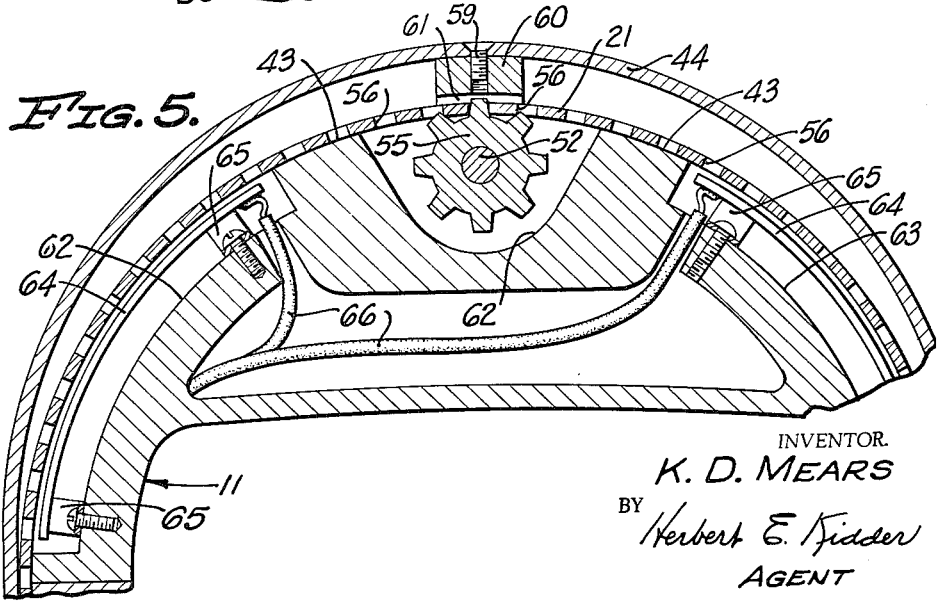
INVENTOR.
K. D. MEARS
BY Herbert E. Kidder
AGENT

United States Patent Office 3,197,808
Patented Aug. 3, 1965

3,197,808
POWER OPERATED LOIN KNIFE
K. D. Mears, 6911 Emil Ave., Bell Gardens, Calif.
Filed May 27, 1963, Ser. No. 283,207
1 Claim. (Cl. 17—1)

The present invention relates generally to meat-cutting knives, and more specifically, to a new and improved loin knife for cutting the loin out of a pork carcass.

In cutting out the pork loin, the meat cutter has heretofore used a downwardly bowed draw knife having a pair of handles at opposite ends thereof, which are grasped in both hands, and the knife is forcibly pulled through the refrigerated carcass so that the bowed blade passes under the loin and cuts the latter free. The cold meat and hardened fat offer a great deal of resistance to the passage of the knife, and the job of cutting out loins is hard work, requiring considerable strength and endurance on the part of the cutter. Also, it is necessary to immerse the draw knife in hot water between cuts, so as to melt off the congealed fat and heat up the blade to make it cut easier. This is messy, and not too effective, as the blade loses its heat rapidly while passing through the refrigerated carcass, and is quite cold by the end of the cut.

The primary object of the present invention is to provide a new and improved loin knife that is power-operated, so that the amount of work required of the operator in cutting out a pork loin is greatly reduced.

Another object of the invention is to provide a loin knife having means for electrically heating the blade during the cutting operation, so as to minimize the resistance offered by the hardened fat, and help keep the blade clean.

Still a further object of the invention is to provide a power-operated, electrically heated loin knife, in which the controls for starting and stopping the driving motor, and for controlling the heating elements, are combined in a single control that is located within easy finger-reach of the handles so that the operator can control the operation of the knife at all times without setting the knife down or removing his hands from the handles.

These and other objects and advantages of the present invention will become apparent to those skilled in the art upon consideration of the following detailed description of the preferred embodiment thereof, reference being had to the accompanying drawings, wherein:

FIGURE 3 is an enlarged sectional view, taken at 3—3 in FIGURE 1;

FIGURE 4 is an enlarged fragmentary sectional view, taken at 4—4 in FIGURE 1; and FIGURE 5 is a sectional view taken at 5—5 in FIGURE 4.

Figure 1:
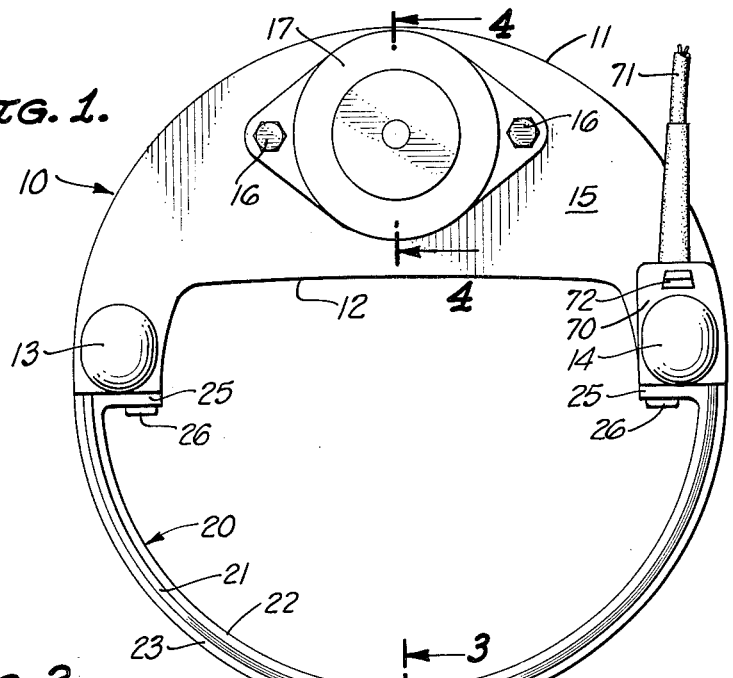
FIGURE 1 is a front elevational view of a power operated loin knife embodying the principles of the invention.
Figure 2:
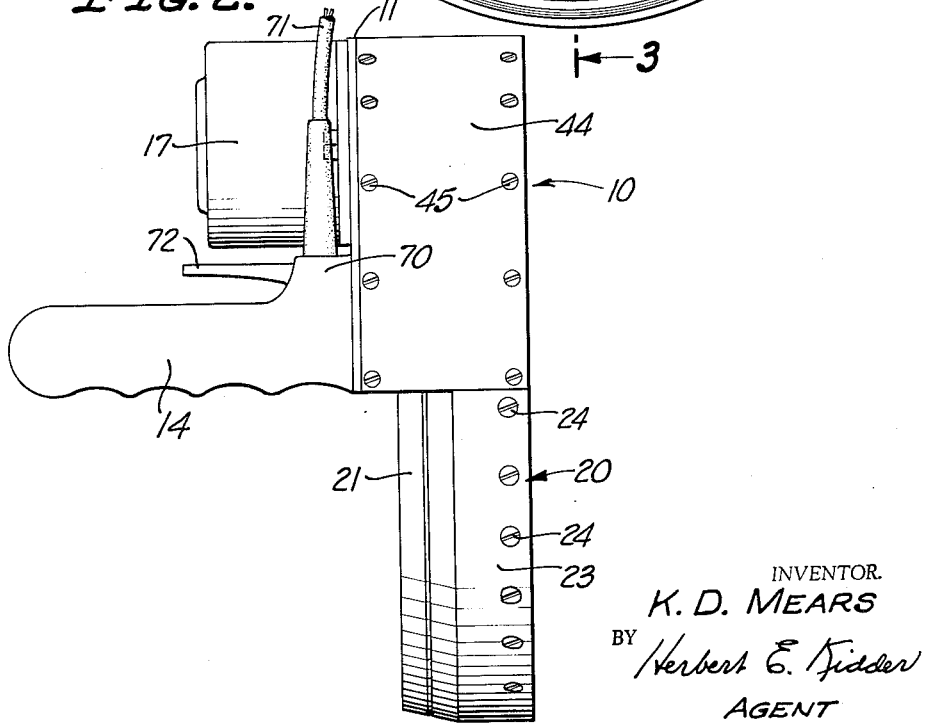
FIGURE 2 is a side elevational view of the same.

In the drawings, the loin knife of my invention is designated in its entirety by the reference numeral 10, and as shown in FIGURE 1, is generally annular, or ring-shaped in configuration. The top half of the device comprises a housing 11, preferably of aluminum, which is approximately circular on the outside, and which is arched on the underside at 12 to provide clearance. Projecting forwardly from opposite sides of the housing 11 near the bottom edge thereof, are two handles 13 and 14. The housing 11 includes a front wall 15, and mounted thereon by means of screws 16 in an electric motor 17.

Fixed to and extending downwardly from the bottom of the housing 11 at opposite sides thereof is a substantially semi-circular guard 20, that encloses the lower half of an annular blade 21 except for the sharp cutting edge of the blade, which protrudes forwardly from the guard. The guard 20 comprises two arcuate strips 22 and 23, which overlie one another and are joined together by a plurality of screws 24. The inner strip 22 has inwardly bent mounting flanges 25, and these abut against the underside of the housing 11 and are secured thereto by screws 26.

As best shown in FIGURE 3, the two strips 22 and 23 are cut back at 30 and 31 to provide clearance between their facing surfaces for the blade 21. There are also opposed grooves 32 and 33 formed in the strips 22 and 23, which receive the two halves 34 and 34′ of a bearing member which guides and supports the blade 21. The two halves 34 and 34′ of the bearing member are provided with a cylindrical cavity 35, which receives a cylindrical bearing spline 36 formed on the back of the blade 21. At the point where the bearing spline 36 is joined to the blade, the latter is necked down slightly at 40, and the bearing member 34, 34′ has ridges 39 which project down into the grooves thus formed, to provide a grip for the bearing member on the spline, so that the blade is retained within the guard 20, and cannot be withdrawn therefrom.

In the upper half of the device, the blade 21 is enclosed within the housing 11, and the bearing spline 36 runs within a split bearing member 42 which is identical to the bearing member 34, 34′ and serves as a continuation thereof. The blade 21 runs within a channel 43 formed in the outer surface of the housing 11 around the periphery thereof, which is enclosed by an arcuate cover plate 44, that is secured along both edges to the housing 11 by screws 45.

The annular blade 21 is preferably made of stainless steel, and is supported by the bearing members 34, 34′ and 42 for revolving about its center of curvature. The center of curvature of the blade is located approximately at the center of the device, as seen in FIGURE 1, and the blade is driven by the motor 17 through driving means which will now be described. The motor 17 has a drive shaft 46, and mounted on the end thereof is a pinion 50 which drives a gear 51. The gear 51 is mounted on one end of a shaft 52, which is journaled within bearings 53 and 54, and projects through the front wall 15 into the housing of the motor 17.

Mounted on the shaft 52 between the bearings 53, 54 is a sprocket wheel 55, the teeth of which mesh with sprocket holes 56 in the blade 21. The sprocket holes 56 are formed in an endless line extending around the length of the blade, parallel to the cutting edge, and the blade is thus caused to revolve as the sprocket 55 rotates. A back-up block 60 is secured by screws 59 to the underside of the cover plate 44 directly above the sprocket wheel 55, and straddles the latter. Two spaced-apart bearing ridges 61 project downwardly from the underside of the back-up block 60 and engage the blade 21 on opposite sides of the line of sprocket holes 56, to hold the blade 21 down against the sprocket wheel 55. As shown in FIGURE 5, the housing 11 is formed with an approximately semi-circular recess 62, in which the sprocket wheel 55 is disposed.

On opposite sides of the sprocket wheel 55, the channel 43 is undercut with circumferentially extending recesses 62 and 63, within which are disposed two strip heaters 64. The two strip heater 64 are electric resistance strips mounted on brackets 65, and they are arcuately curved to follow the curvature of the closely adjacent, overlying blade 21. Wires 66 are connected to the ends of the resistance strips 64, and these wires go to a switch 70 at the base of the right-hand handle 14. The motor 17 is also connected electrically to the switch 70, and a power supply wire 71 provides current for both the motor and strip heaters. A thumb-controlled switch lever 72 projects out over the handle 14, and when this lever is depressed, both the motor and strip heaters 64 are energized. Preferably, the switch 70 is constructed and arranged so that when the lever is partially depressed, only the strip heaters 64 are energized; and when the lever 72 is fully depressed, both the motor 17 and strip heaters 64 are energized. Means (not shown) is provided for locking the lever 72 at the partially depressed position, so that the strip heaters 64 are energized and kept hot even when the loin knife is not being used. If desired, the switch lever 72 can also be made to lock down at the fully depressed position, so that the motor 17 and strip heaters 64 operate continuously.

The motor 17 drives the knife 21 at several hundred revolutions per minute, which enables the blade to cut through a refrigerated pork carcass with the greatest of ease. The blade 21 is heated by the strip heaters 64 to a sufficiently high temperature to melt away any congealed fat that may adhere to the blade or that becomes packed between the blade and the guard strips 22, 23. A temperature of from 120° F. to 200° F. is sufficient for this purpose, and the heaters 64 are thermostatically controlled to prevent them from exceeding this range of temperature.

The operation of the invention is believed to be self-evident form the foregoing description. When the meat cutter is ready to cut out a loin, the downwardly projecting portion of the blade 21 is placed on a carcass at one end of the loin, and the switch lever 72 is depressed. This causes the blade 21 to revolve at a fairly high speed, and at the same time causes the strip heaters 64 to heat up the blade. The knife is then pulled toward the cutter, and the rapidly revolving blade slices its way through the carcass in a smooth, neat cut, that requires practically no effort on the part of the operator, other than guidance.

While I have shown and described in considerable detail what I believe to be the preferred form of my invention, it will be understood by those skilled in the art that various changes may be made in the shape and arrangement of the several parts without departing from the broad scope of the invention as defined in the following claim.

I claim:

A power operated loin knife comprising in combination:

a housing having a pair of handles at opposite sides thereof;

an arcuate guard attached to the bottom of said housing and projecting downwardly therefrom in a generally vertical plane;

an annular, endless blade enclosed partly within said housing and partly within said guard, the cutting edge of said blade projecting forwardly from the front edge of said guard;

said blade being necked down near its back edge to form shallow, lengthwise-extending grooves on opposite sides of the blade;

a bearing block seated within said guard and engaging the back edge of said blade, siad bearing block having ridges which project down into said grooves so as to retain said blade within said guard;

an electric motor mounted on said housing and having a sprocket wheel mounted on the drive shaft thereof, said sprocket wheel meshing with sprocket holes in said blade;

a back-up block mounted on said housing directly above said sprocket wheel, said back-up block having two spaced-apart bearing ridges which bear against said blade on opposite sides of the line of sprocket holes therein, to hold said blade down against the sprocket wheel;

a pair of strip heaters mounted on said housing on opposite sides of said sprocket wheel and extending parallel to said blade closely adjacent thereto; and switch means for energizing said electric motor and said electric heater.

References Cited by the Examiner

UNITED STATES PATENTS

| 692,824 | 2/02 | Burleson | 146—77 |
| 1,636,530 | 7/27 | Nyhus | 146—1 |
| 2,904,826 | 9/59 | Hotard | 17—23 |
| 2,962,752 | 12/60 | Massengill | 17—1 |

SAMUEL KOREN, *Primary Examiner.*

LUCIE H. LAUDENSLAGER, *Examiner.*